Nov. 11, 1947.  W. G. BOYD  2,430,489
BREECH MECHANISM FOR MACHINE GUNS
Filed April 16, 1943
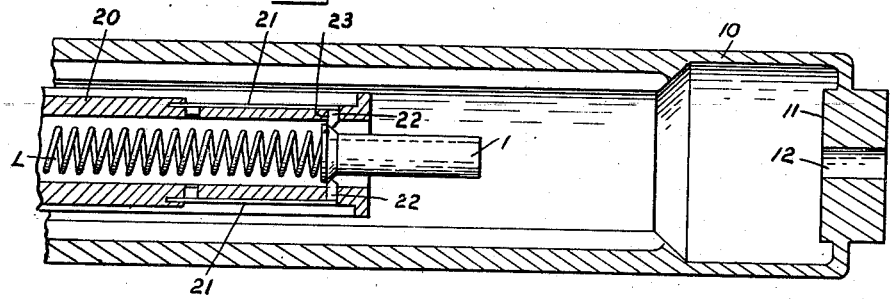
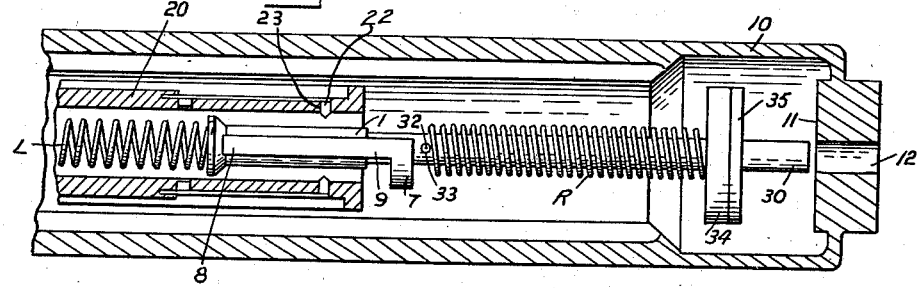
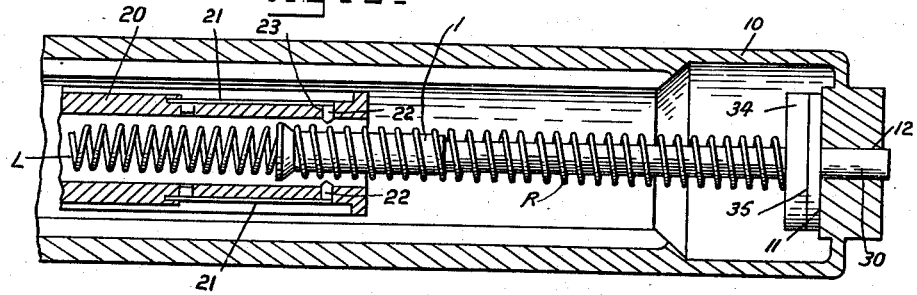
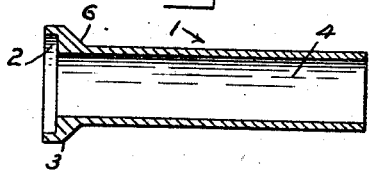   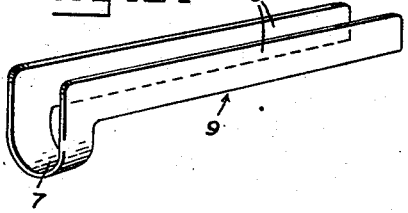
Inventor
William G. Boyd Patented Nov. 11, 1947

2,430,489

UNITED STATES PATENT OFFICE 2,430,489

BREECH MECHANISM FOR MACHINE GUNS

William G. Boyd, Salinas, Calif.; J. A. Cornett administrator of said William G. Boyd, deceased Application April 16, 1943, Serial No. 483,244

5 Claims. (Cl. 89—199)

(Granted under the act of March 3, 1883, as amended April 30, 1928; 370 O. G. 757)

The invention described herein may be manufactured and used by or for the Government for governmental purposes without the payment of any royalty thereon.

This invention relates to machine guns of the class represented by the so-called Thompson submachine gun (which as manufactured in recent years has embodied many improvements by various inventors), and more particularly, to the bolt mechanism thereof. An example closely approximating the particular receiver contemplated here is found in the patent to O. V. Payne, No. 1,817,321, Aug. 4, 1931. See also: Payne 1,860,157, May 24, 1932; Eickhoff, 1,437,889, Dec. 5, 1922; Thompson, Nos. 1,425,808, 1,425,809 and 1,425,810 Aug. 15, 1922; to which this invention is adaptable. In the Thompson submachine gun a long coil spring employed as a recoil spring for operating the bolt is disposed in compressed condition between a stop at one end of the receiver casing and a stop at the opposite end of the bolt actuator. This coil spring is necessarily of considerable length in its uncompressed state and must undergo considerable compression and reduction in length before it can be fitted, in compressed condition, between the receiver casing and the bolt actuator. Malfunction resulted from the lateral instability of the prior spring when compressed due to lateral deformation and kinking of the spring. Also, replacement of the spring after the frequent removals and cleaning which are necessary, entails a troublesome and time-consuming procedure in assemblage, calling for not only strength and steadiness of hand but also some degree of dexterity. Permanent deformation and kinking of the spring often occurs due to this difficulty. It is the object of this invention to devise a recoil spring mechanism which is facilely and quickly assembled and disassembled, without the requirement of skill or dexterity on the part of the gunner or mechanic and without the expenditure of the considerable forces now required in assembling the present recoil spring for the Thompson submachine gun. One embodiment of the invention is shown in the accompanying drawing wherein:

Fig. 1 is a sectional horizontal view of a portion of the receiver casing and the bolt actuator looking upward, showing one of the pair of improved springs in place, in one stage of assembling the recoil springs.

Fig. 2 is similar to Fig. 1, but shows a succeeding stage of assembling, with the second of the pair of improved springs in a preliminary position.

Fig. 3 is similar to Figs. 1 and 2, but shows the said second spring in final position in place on the bolt mechanism of the gun.

Fig. 4 is a sectional view of the compressor-coupling of the improved recoil spring assemblage.

Fig. 5 is a perspective view of the compressor tool used in assembling the improved springs.

The recoil spring of the Thompson submachine gun is compressed between the right end (as viewed in Fig. 1) of the receiver casing 10 where it bears against the end wall 11 of the casing and the left end (not shown in the figures) of the bolt actuator 20. The receiver casing 10 is tubular and contains the bolt actuator 20; and the latter is likewise tubular or hollow, to contain the recoil spring. The left end (not shown) of bolt actuator 20 is closed to furnish a stop for that end of the compression spring; its right end is open to receive the spring.

The recoil spring is made in accordance with this invention in two parts, viz., a left portion L (shown in Figs. 1 to 3) and a right portion R (shown in Figs. 2 and 3), coaxially behind the other, which may be termed "tandem springs." One purpose in making the spring in two parts, which are preferably of substantially equal lengths, is to avoid the awkwardness of handling a single long coil spring in view of the degree of reduction and compression it must undergo in assembling (as mentioned above). The left spring L being placed within the bolt actuator 20 with one end extending rightward of its open end. That end of spring L is seated in the rabbeted mouth 2 of a compressor-coupling member 1, shown in Fig. 4. This member is generally of tubular form having in addition to its inner bore 4, a flanged left end 3, the outer face of which is provided with the said rabbeted spring seat 2. As clearly seen in Fig. 4, the flanged end 3 of the member is its widest portion; the outside diameter of the flanged end 3 is somewhat less than the inner bore of the actuator 20, so that the member may be received loosely therein. The compressor-coupling member 1 is made sufficiently long to enable the right, extended portion of the member to be manipulated and forced leftwardly within the receiver 10 after insertion from below at the right end (these receivers being customarily open below so that such assembly may be effected, by removing the trigger housing), to compress spring half L. Compressor-coupling member 1 remains in position in the assemblage, and in this respect is more than a mere tool. In remaining in place, member 1 serves to hold spring half L in position within the bolt actuator 20 and in compressed condition. For this purpose the open end of bolt actuator 20 is provided with one or more spring fingers 21 secured at one end on the outside or external surface of the actuator and provided at its distal end with a pointed or beveled detent 22 which clears through holes 23 in the actuator wall. By reason of the pointing or beveling of the detents, a beveled surface is presented to the outer edge or corner of the flange 3 of the compressor-coupling member 1, which causes the detents to be cammed outwardly, to permit passage of the member 1, against the urging of the spring fingers 21. The detents snap back, as shown in Fig. 1, with their opposite beveled surfaces in contact with a beveled shoulder 6 of the flange.

Permitting the spring half L to remain in compressed position together with the compressor-depressor member 1 (as shown in Fig. 1), the other or right spring half R is placed on the pilot rod 30 and compressed between an integral collar 34 on the rod and the other (or left, as viewed in Fig. 3) end of the rod; the right spring R being temporarily held in compressed condition by a pin 32 which is slipped into a pin hole 33 drilled through rod 30 for that purpose. The pilot rod with right spring R held compressed, as described, between temporary pin 32 and integral collar 34 and with the annular end washer or pad 35 also in place, is then slipped into place as shown in Fig. 2, with the left end of rod 30 passed through the bore 4 of the compressor-coupling member 1. To provide room for receiving the end of the pilot rod assemblage in the open (right end, Fig. 2) of the bolt actuator 20, the member 1 is pushed leftwardly, Fig. 2, to compress left spring L. To facilitate this leftward movement of member 1 and the leftward compression of left spring L, a tool 9, see also Fig. 5, is provided; tool 9 has a pair of parallel fingers 8 joined together at their rearward ends by a nose-piece 7 in the form of a half-circle. The tool may be conveniently stamped out of sheet plate and bent into the form shown. The two fingers 8, which may be curved to the curvature of a circle having a center point on the longitudinal axis of the tool, are separated a distance somewhat greater than the outside diameter of the spring L or R. The tool is inserted as shown in Fig. 2 with the ends of its pair of fingers 8 abutting the flange portion 3 of the compresor-coupling member 1. By means of pressure applied to its nose-piece 7, tool 9 is pushed leftwardly (see Fig. 2) moving the compressor-coupling member 1 to the left of the detents 22. The leftward displacement of member 1 affords sufficient clearance between the right end of the bolt actuator 20 and the left end of receiver casing 10 in which the pilot rod 30 may be received, as shown in Fig. 2.

It will be seen in Fig. 2 that the pilot rod 30 is in alignment with the center hole 12 provided in the right end wall of the receiver casing. The right end of pilot rod 30 is entered in the casing hole 12 and the tool allowed to be returned rightwardly under urgency of the compressed spring L. The tool 9 is then removed, and the temporary pin 32 withdrawn from below to permit the parts to assume the positions shown in Fig. 3, with the right end of left spring L seated in the rabbeted mouth 2 at the left end of the compressor-coupling member 1 and with the left end of right spring R seated against the beveled face 6 of the flange 3 of the compressor-coupling member.

In the positions of the parts shown in Fig. 3 the parts are in the counterrecoil positions, as may be understood from a knowledge of the action of these guns, and the bolt actuator 20 is thus at the forward limit of its movement. The two springs are thus fully expanded to the limit of the wall 11 and forward end of the bolt actuator and their components of force of reaction opposed at the coupling member 1 have arrived at a balanced condition with the enlarged head or flanged end 3 of the coupling member and guide 1 disposed a substantial distance within the bolt actuator 20, and the pilot rod still engaged a substantial distance within the coupling member. The latter condition means that the rear spring is firmly supported throughout its length against lateral bowing or swinging because of the flange being positioned outwardly of the springs so as to rest slidingly against the inner surface of the actuator 20 and because of the telescoped relation of the pilot rod and coupling member 1. The forward section of the spring being disposed within the smooth walls of the actuator cannot bow materially and jam, and does not require a pilot support as does the rear section, which may be hooked by the end of the actuator on recoil if the spring becomes bowed.

It should also be noted that the direction of twist in the front portion L is opposite the direction of twist to the rear portion R, so that high torque stresses are not set up as in the old single spring, which was one large contributing cause in malfunctions resulting from buckling or kinking of the spring.

In the invention the torque which tends to develop in both springs when they are compressed acts counterclockwise at their mutually proximal ends and the interposed part 3 being free to rotate in the actuator 20, the stress is immediately relieved by the free rotation of the opposed ends of the spring and guide-coupling 1. As they are relieved of compression, opposite rotation occurs in these parts.

The consequent reduced tendency to buckle also minimizes friction of the guide-coupling member 1 and spring against the sides of the actuator.

What is claimed is:

1. In a recoil and bolt operating spring assembly, a receiver, a tubular reciprocating bolt actuator therein having an open rear end and movable from a rear recoil limit to a forward battery position in the receiver, a protractile helical spring slidable in and seated forwardly in the actuator, a tubular coupling and guide member slidable longitudinally in the actuator comprising a reduced rear end and an enlarged forward end having the rear end of the spring seated thereagainst, a second spring in coaxial tandem relation to the first named spring, receiving in its forward end the reduced part of said coupling and guide member and bearing against the said enlarged end of the latter, and a pilot rod telescopically engaged with and slidable through the coupling member and through the second spring and having a seat at its rear part for the second spring, said pilot rod being constructed to seat displaceably in the rear of the receiver, said springs being constructed so that at battery position of the actuator the coupling member lies partly in the actuator and extends around the said rod a distance rearward of the actuator, said rod stopping closely adjacent the rear end of the actuator when the latter is at said battery position.

2. The structure of claim 1 in which the coupling and guide member are freely rotatable in the actuator, said two springs being coiled in opposite directions, whereby torque stresses developed in the springs by compression are relieved by rotation of the guide.

3. The structure of claim 1 in which said guide is a sleeve, a pilot rod engaged in the sleeve and slidable in the springs and the guide and having a spring seat thereon receiving the outer end of the second spring, said rod being set against the said rear seat, said rod having a forward clearing position for removal and having a transverse hole therethrough spaced from the spring seat less than the distance between the actuator and the said spring seat when the pilot rod is at said forward position, and a confining pin for the second spring engageable removably through said hole.

4. The structure of claim 1 in which a detent is provided in the actuator constructed to engage and yieldingly check said enlargement at an extreme outer position of the guide within the actuator yieldable to manual force on the guide for removal.

5. In a breech mechanism having a receiver with a longitudinally reciprocable recoil operated actuator as in the prior art, wherein a recoil spring confined back of the actuator in the receiver said actuator is utilized, the spring being engaged a substantial distance slidably in the actuator and across a space in the receiver, said actuator having a battery position and a recoiled position and wherein a stud rod is stepped in the rear end of the receiver slidable in the spring but stopping short of the battery position of the actuator: the improvement consisting in forming the spring in two parts constituting tandem front and rear springs, a tubular guide of mushroom shape having its head set forwardly and slidably in the receiver against the front spring and having a rearward stem inserted in the rear spring, and extended rearward sufficiently to receive the end of said rod slidably therein, said springs being proportioned so as to balance when operatively extended, with said head forwardly of the rear end of the receiver, and a retractable detent on the actuator rearwardly of the balanced spring position of said head when the actuator is at battery position, and in the path of insertion and removal of the head, said head and detent constructed for yieldable wiping engagement under longitudinal manual movement of the head.

JAMES A. CORNETT,
*Administrator of estate of William G. Boyd, deceased.*

REFERENCES CITED

The following references are of record in the file of this patent:

UNITED STATES PATENTS

| Number | Name | Date |
|---|---|---|
| 1,249,622 | Hedrick | Dec. 11, 1917 |
| 1,408,445 | Declaye | Mar. 7, 1922 |
| 1,484,163 | Vincon | Feb. 19, 1924 |
| 1,574,701 | Schmeisser | Feb. 23, 1926 |
| 1,335,500 | Hasting | Mar. 30, 1920 |
| 898,038 | Clarus | Sept. 8, 1908 |
| 1,817,321 | Payne | Aug. 4, 1931 |
| 2,321,592 | Green et al. | June 15, 1943 |

FOREIGN PATENTS

| Number | Country | Date |
|---|---|---|
| 227,303 | Germany | Oct. 18, 1910 |
| 47,221 | Norway | Nov. 18, 1929 |
| 215,426 | Switzerland | Jan. 5, 1942 |